United States Patent

Dummermuth

[11] Patent Number: 5,936,368
[45] Date of Patent: Aug. 10, 1999

[54] NON-LINEAR PROPORTIONAL/INTEGRAL FEEDBACK CONTROLLER

[75] Inventor: Ernst Dummermuth, Chesterland, Ohio

[73] Assignee: Reliance Electric Industrial Company, Cleveland, Ohio

[21] Appl. No.: 09/057,258

[22] Filed: Apr. 8, 1998

[51] Int. Cl.[6] ................................................. G05B 1/02
[52] U.S. Cl. .................... 318/608; 318/254; 318/138; 318/439; 318/568.22; 318/610; 318/609
[58] Field of Search .................................. 318/608, 254, 318/138, 439, 568.22, 610, 609; 475/186

[56] References Cited

U.S. PATENT DOCUMENTS

| | | | |
|---|---|---|---|
| 4,884,016 | 11/1989 | Aiello | 318/685 X |
| 5,187,417 | 2/1993 | Minnich et al. | 318/254 |
| 5,669,845 | 9/1997 | Muramoto et al. | 318/608 |

*Primary Examiner*—Karen Masih
*Attorney, Agent, or Firm*—Keith M. Baxter; John M. Miller; John J. Horn

[57] ABSTRACT

A simple modification to a proportional integral controller allows for non-linear control strategies while maintaining the simplicity of set up and tuning of the loop through modifying the proportional and/or integral gains $K_p$, $K_j$ by a linear or parabolic function of the feedback error signal. Provision is made for symmetrical or asymmetrical gain modification functions.

5 Claims, 1 Drawing Sheet

NON-LINEAR PROPORTIONAL/INTEGRAL FEEDBACK CONTROLLER

CROSS-REFERENCE TO RELATED APPLICATIONS

BACKGROUND OF THE INVENTION

The present invention relates to feedback controllers for controlling machines, and in particular, to a technique for providing non-linear feedback control through a simple adaptation of a linear, proportional/integral feedback controller.

In feedback controllers, a command signal (e.g., a desired velocity) is compared to a process signal (e.g., a measured velocity) to produce an error signal. This error signal is used to generate a control signal, such as voltage to a motor or a hydraulic valve, which adjusts the velocity appropriately.

In a simple control system, the control signal may be proportional to the error signal. Thus, as the magnitude of the error signal increases so does the magnitude of the control signal. More sophisticated control systems are possible including proportional/integral (PI) control where the control signal is the sum of a proportional part (a constant factor $K_p$ times the error signal) plus an integral part (a constant factor $K_j$ times the error signal). The integral factor augments the proportional factor by providing some "memory" of the historical error to provide a suitable offset counteracting that error. For example in a motor controller, the integral term may compensate for a steady constant frictional resistance on the motor. A PI controller, by allowing the gain of the integral and proportional term to be separately adjusted, allows improved tuning of the controller. In a PI controller, the user need contend with only two variables $K_p$ and $K_j$, and the setting of these two variables (tuning the control system) is relatively intuitive.

PI controllers are termed linear controllers because the control output is a linear function of the error signal. Linear controllers have the advantage of being easier to analyze mathematically. Nevertheless, linear controllers may not be optimal for all control situations.

Unfortunately, the introduction of non-linearity to a feedback controller substantially increases the complexity and difficulty of programming and tuning the controller. The introduction of non-linear terms can create unexpected instabilities in control for the inexperienced programmer and greatly increases the number of factors involved in tuning. What is needed is a non-linear controller that approaches the simplicity and robustness and intuitive nature of a linear PI controller.

BRIEF SUMMARY OF THE INVENTION

The present inventors have recognized that a useful class of non-linear control relationships may be obtained simply by modifying the proportional and the integral gain factors of a PI controller as linear or parabolic functions of the error signal. In its simplest embodiment, the user need only select two additional variables (beyond $K_p$ and $K_j$), a function shape of either linear or parabolic, and the extreme of the function value. With this approach, gain varies smoothly with changes in error signal, instabilities resulting from abrupt or non-monotonic gain changes are avoided.

Specifically, the present invention provides a non-linear conversion circuit for use with a proportional or PI type controller. The non-linear conversion circuit includes a user input for receiving a desired gain for the controller and a function generator receiving the feedback error signal. A non-constant function of the error signal is produced as a gain modifier which changes the gain according to the gain modifier. The gain may be either the proportional gain, the integral gain or both.

Thus, it is one object of the invention to provide non-linear control capabilities in a system having the simplicity and intuitive nature of a PI type controller.

The non-constant function may be linear about a value of zero feedback error or may be parabolic about a value of zero feedback error.

Thus, it is another object of the invention to provide two degrees of non-linearity such as are believed to address many control situations and yet which eliminate the need for the user to define complex functional dependencies.

The non-constant function may be a value of 1.0 for a value of zero feedback error signal.

Thus, it is another object of the invention to cause the controller to revert to a standard proportional/integral controller with user-defined gains when the feedback error is substantially zero.

For the proportional gain block, the non-constant function is non-zero for all feedback error signals.

Thus, it is another object of the invention to prevent the user from inadvertently opening the control loop by assigning a zero proportional gain value to the controller.

The foregoing objects and advantages of the invention will appear from the following description. In the description references are made to the accompanying drawings which form a part hereof and in which there is shown by way of illustration a preferred embodiment of the invention. Such embodiment does not necessarily represent the full scope of the invention, however, and reference must be made, therefore to the claims for interpreting the scope of the invention.

DETAILED DESCRIPTION OF THE INVENTION

Figure 1:
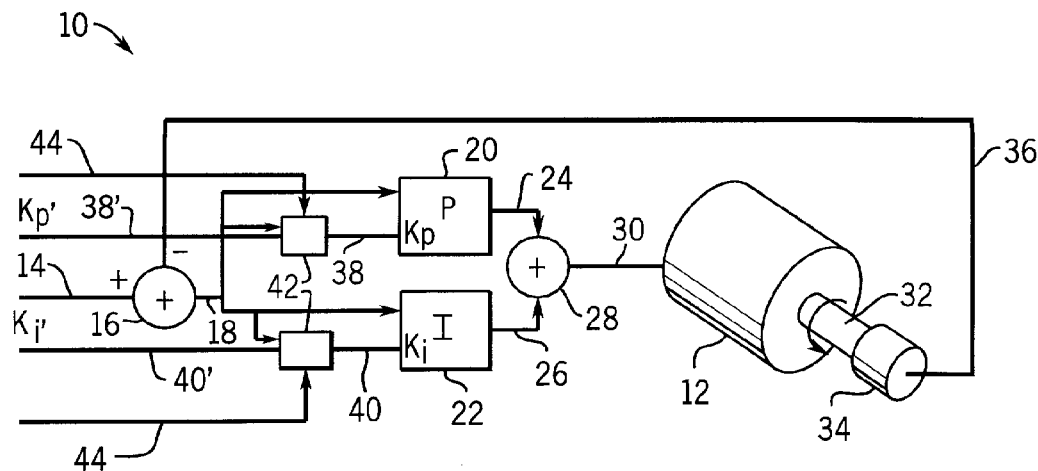
FIG. 1 is a block diagram of a proportional/integral feedback controller having proportional and integral control elements and incorporating the non-linear conversion circuit of the present invention.

Referring now to FIG. 1, a feedback control system 10 may be used to control the velocity of a motor 12. A command input 14, in this example motor velocity, is received by summing block 16 to produce an error signal 18. Error signal 18 is provided to a proportional element 20 and an integral element 22 which produce proportional output 24 and integral output 26, respectively. These are summed at summing block 28 to produce a control signal 30, in this case motor voltage, used to drive motor 12. The shaft 32 of motor 12 is connected to a tachometer 34 providing velocity feedback signal 36 received at an inverting input of the summing block 16 to be subtracted from the command input 14 to produce the previously described error signal 18.

The proportional element 20 receives a gain value 38 designed $K_p$ and the integral element 22 receives an integral gain value 40 designed $K_j$ each which determine the relative gain implicit in those blocks. The above described elements are standard components of a proportional/integral controller well known to those of ordinary skill in the art.

Normally the gains $K_p$ and $K_j$ are provided directly by the user, and therefore a user-defined proportional gain 38' (designated $K'_p$) is identical to the proportional gain 38 received by the proportional element 20 and the user-defined integral gain 40' (designated $K'_j$) is identical to the integral gain 40 received by the integral element 22.

In the present invention, however, the user defined gains 38' and 40' are intercepted by gain modification blocks 42. A first gain modification block 42 receives user defined proportional gain 38' ($K'_p$) and produces proportional gain 38 ($K_p$) and the second block receives user-defined integral gain 40' ($K'_j$) and produces integral gain 40 ($K_j$). The gain modification blocks 42 also receive programming values 44 as will be described below.

Figure 2:
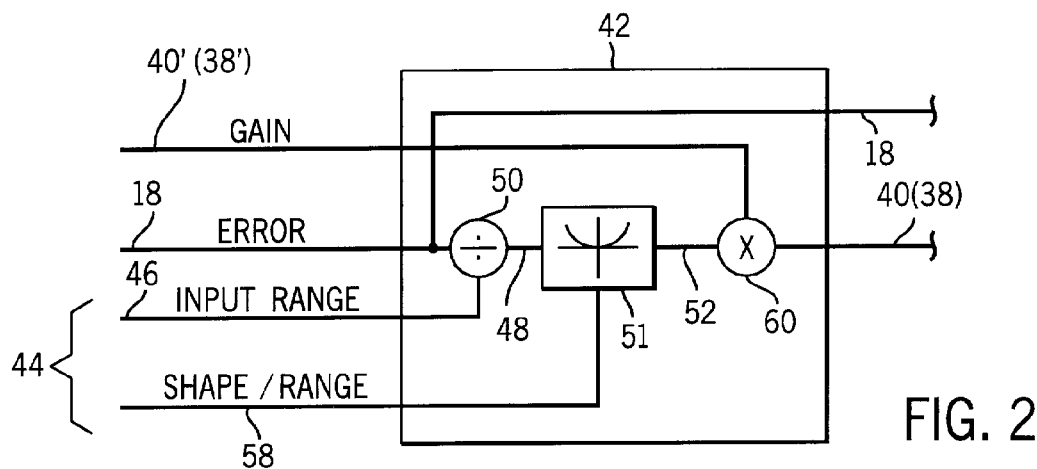
FIG. 2 is a block diagram of the non-linear conversion circuit of FIG. 1 showing a function generator for generating a gain modifier affecting the gain of the proportional or integral control elements.

Referring now to FIG. 2 each gain modification block 42 is of similar construction and thus only one will be described. For each, the error signal 18 is received by a prescaling, normalizing circuit 50 which divides the error signal 18 by an input range value 46 provided by the user to produce a normalized error signal 48 varying between −1 and +1. Thus, in the example of FIG. 1 of a motor controller, if the range of the error is expected to vary between 100 and −100 RPM (or its voltage equivalent), the input range value 46 will be 100.

The normalized error signal 48 is provided to a function block 51 which produces a gain modifier 52 according to a predetermined function to be described. The normalized error signal 48 provides the range of the function and the gain modifier 52 is the function's value.

Figure 3:
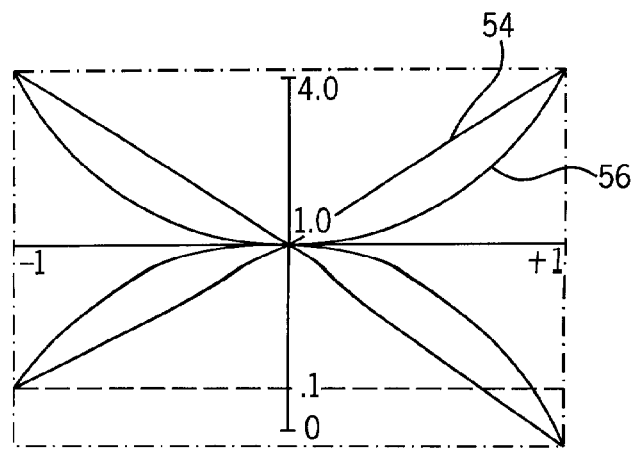
FIG. 3 is a graphical representation of the functions generated by the function block of FIG. 2 for various inputs from the user.

Referring now momentarily to FIG. 3, the present inventors have determined that a number of important control problems may be satisfied with the function of the function block 51 with two basic functional shapes. A linear function 54 following generally the equations:

$$y_p = a_p * |x| + b_p \quad (1)$$

$$y_i = a_j * |x| + b_i \quad (2)$$

where $y_p$ is the gain modifier 52 for the proportional gain $K_p$ and $y_i$ is the gain modifier 52 for the integral gain $K_i$ and x is the normalized error signal 48.

Alternatively, a parabolic function 56 may be chosen according to the equations:

$$y_p = a_p * x^2 + b_p \quad (3)$$

$$y_i = a_i * x^2 + b_i \quad (4)$$

again where $y_p$ is the gain modifier 52 for the proportional gain $K_p$ and $y_i$ is the gain modifier 52 for the integral gain $K_i$ and x is the normalized error signal 48.

In the present invention, the value of b is preferably selected to be 1 so that with a normalized error signal 48 near zero, the gain modifier 52 produced by the gain modification blocks 42 will be near 1 and there will be no gain modification (as will be described) resulting in the controller defaulting to operation in conventional (substantially constant) mode.

In the preferred embodiment, for the gain modification block 42 associated with the proportional element 20, is restricted to values between 0.1 and 4. Preferably too, for the gain modification block 42 associated with integral element 22, is restricted between values of 0 and 4.

Although in the simplest embodiment, the functions 54 and 56 are symmetric about the zero range, it will be understood that they may be made non-symmetrical simply by adding additional input value 44 to provide separate shape range inputs for the left and right side. The values of a and b are provided by the user together with the particular function 54 or 56 in a shape range input 58 shown in FIG. 2 as part of signals 44 shown in FIG. 1.

The error signal 18 also bypasses the blocks 42 to proceed directly to the proportional element 20 and integral element 22 for use therein according to standard practice.

The gain modifier 52 in each block 42 passes to multiplier 60 which receives the user gain 40' or 38' (depending on the block) and multiplies that user gain 40' or 38' by the gain modifier 52 to produce the values of $K_p$ 38 or $K_j$ 40 used directly by the proportional block 20 or the integral element 22.

As will be understood from this description, a linear modification of the gain values $K_p$ or $K_j$ introduces a quadratic term to the relationship between the error signal 18 and the outputs 24 or 26 of the proportional element 20 or integral element 22. Likewise, the parabolic function 56 introduces a cubed term in this relationship. Thus a non-linear control function is established.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. In a closed loop controller having a control element receiving a feedback error signal to generate a command signal provided to a controlled process based on the feedback error signal and a gain, a non-linear conversion circuit comprising:

a) user input circuit for receiving a desired gain for the control element from a user;

b) function generator receiving the feedback error signal and providing a non-constant function of the error signal as a gain modifier;

c) gain modification circuit receiving the gain and the gain modifier to change the gain received by the control element over a plurality of values according to the gain modifier wherein the non-constant function is selected from a group consisting of functions that are linear about a value of zero feedback error signal, parabolic about a value of zero feedback signal, and 1 for a value of zero feedback signal.

2. The non-linear conversion circuit of claim 1 including a prescaler receiving a range of the feedback error signal and scaling the feedback error signal by its range to normalize it to value between 1 and −1 and wherein the function generator has a range of 1 to −1.

3. In a closed loop controller having a control element receiving a feedback error signal to generate a command signal provided to a controlled process based on the feedback error signal and a gain, a non-linear conversion circuit comprising:

a) user input circuit for receiving a desired gain for the control element from a user;

b) function generator receiving the feedback error signal and providing a non-constant function of the error signal as a gain modifier;

c) gain modification circuit receiving the gain and the gain modifier to change the gain received by the control element over a plurality of values according to the gain modifier;

wherein the control element provides a command signal to the controlled process based on a proportion of the feedback error signal according to a proportional gain and wherein the gain modified by the gain modification circuit is the proportional gain; and wherein the gain modification circuit multiplies the proportional gain by the gain modifier and wherein the non-constant function is non-zero for all feedback error signals.

4. The non-linear conversion circuit of claim 3 wherein the function generator has a maximum value of 4 and a minimum value of 0.1.

5. The non-linear conversion circuit of claim 3 wherein the function generator has a maximum value of 4 and a minimum value of 0.

* * * * *

UNITED STATES PATENT AND TRADEMARK OFFICE
CERTIFICATE OF CORRECTION

PATENT NO. : 5,936,368
DATED : Aug. 10, 1999
INVENTOR(S) : Ernst H. Dummermuth

It is certified that error appears in the above-identified patent and that said Letters Patent is hereby corrected as shown below:

On title page, inventors should read as follows:

--Ernst Dummermuth, Chesterland; Brian T. Boulter, Seven Hills; and John M. Haboustak, South Euclid, all of Ohio--

Signed and Sealed this

Twenty-ninth Day of May, 2001

*Attest:*

NICHOLAS P. GODICI

*Attesting Officer*     Acting Director of the United States Patent and Trademark Office